(12) United States Patent
Kawabata et al.

(10) Patent No.: US 11,652,927 B2
(45) Date of Patent: May 16, 2023

(54) IMAGE READING DEVICE AND RECORDING DEVICE

(71) Applicant: Seiko Epson Corporation, Tokyo (JP)

(72) Inventors: Seiji Kawabata, Matsumoto (JP); Kazunori Mori, Matsumoto (JP); Yutaro Kajitani, Matsumoto (JP); Masato Ogawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/648,855

(22) Filed: Jan. 25, 2022

(65) Prior Publication Data

US 2022/0239787 A1 Jul. 28, 2022

(30) Foreign Application Priority Data

Jan. 28, 2021 (JP) .............................. JP2021-011757

(51) Int. Cl.
*G06F 3/12* (2006.01)
*H04N 1/00* (2006.01)

(52) U.S. Cl.
CPC ..... *H04N 1/00037* (2013.01); *H04N 1/00798* (2013.01)

(58) Field of Classification Search
CPC ........................ H04N 1/00037; H04N 1/00798
See application file for complete search history.

(56) References Cited

U.S. PATENT DOCUMENTS

| | | | | |
|---|---|---|---|---|
| 2004/0095619 | A1* | 5/2004 | Akaba | H04N 1/1008 358/509 |
| 2007/0216967 | A1* | 9/2007 | Ueno | H04N 1/0083 358/486 |
| 2013/0329265 | A1* | 12/2013 | Miyamoto | H04N 1/0464 358/496 |
| 2014/0226172 | A1* | 8/2014 | Kadobayashi | H04N 1/10 358/1.13 |

FOREIGN PATENT DOCUMENTS

| | | |
|---|---|---|
| JP | H04-347842 | 12/1992 |
| JP | H11-122993 | 4/1999 |

* cited by examiner

*Primary Examiner* — Huo Long Chen
(74) *Attorney, Agent, or Firm* — Workman Nydegger

(57) ABSTRACT

Provided is an image reading device including: a reading unit reading an image on a document; a carriage moving with the reading unit; a detector included in the carriage and having a predetermined width in a movement direction of the carriage; a detection sensor being in a detection state when the detector is located at a position where the detector faces the detection sensor and being in a non-detection state when the detector is located at a position where the detector does not face the detection sensor; and a control portion configured to perform a positional shift determination operation of determining a positional shift of the carriage, in which, as the positional shift determination operation, the control portion starts to move the carriage when the detection sensor is in the detection state and determines the positional shift of the carriage, based on a moving amount of the carriage.

7 Claims, 8 Drawing Sheets

FIG. 1
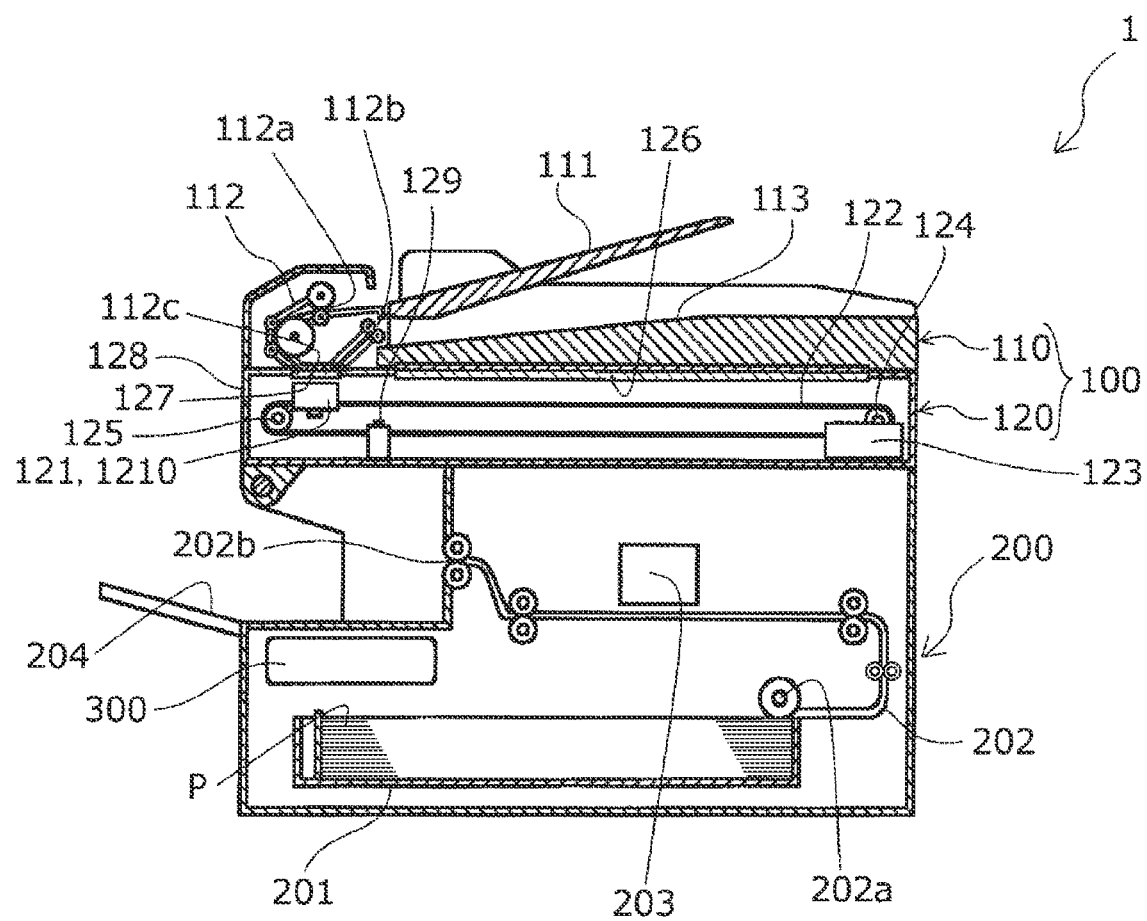
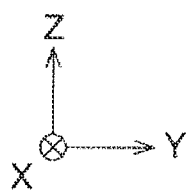

IMAGE READING DEVICE AND RECORDING DEVICE

The present application is based on, and claims priority from JP Application Serial Number 2021-011757, filed Jan. 28, 2021, the disclosure of which is hereby incorporated by reference herein in its entirety.

BACKGROUND

1. Technical Field

The present disclosure relates to an image reading device and a recording device.

2. Related Art

Hitherto, image reading devices having various configurations have been used. Among them, an image reading device capable of reading an image on a document by moving a carriage provided with a reading unit is used. Such an image reading device cannot read an accurate image when the carriage is shifted due to tooth skipping and step-out. Thus, an image reading device capable of determining whether or not the carriage is shifted is disclosed. For example, JP-A-11-122993 discloses a scanner control device capable of determining whether or not a scanner is shifted by reciprocating the scanner as a carriage provided with a reading unit and comparing a time required for the reciprocating with a predetermined value set in advance.

However, a method of determining a positional shift of the scanner that can be performed in the scanner control device in JP-A-11-122993 requires a long time because it takes time to reciprocate the scanner. Thus, it is preferable to determine whether or not the carriage is shifted in a short time.

SUMMARY

An image reading device according to an aspect of the present disclosure includes: a reading unit reading an image on a document; a carriage provided with the reading unit and moving with the reading unit; a detector included in the carriage and having a predetermined width in a movement direction of the carriage; a detection sensor being in a detection state when the detector is located at a position where the detector faces the detection sensor and being in a non-detection state when the detector is located at a position where the detector does not face the detection sensor; and a control portion configured to perform a positional shift determination operation of determining a positional shift of the carriage in the movement direction, in which, as the positional shift determination operation, the control portion starts to move the carriage when the detection sensor is in the detection state and determines, based on a moving amount of the carriage from the detection state to the non-detection state of the detection sensor, the positional shift of the carriage.

BRIEF DESCRIPTION OF THE DRAWINGS

FIG. 1 is a front cross-sectional view of a printer according to an embodiment of the present disclosure.

DESCRIPTION OF EXEMPLARY EMBODIMENTS

Figure 2:
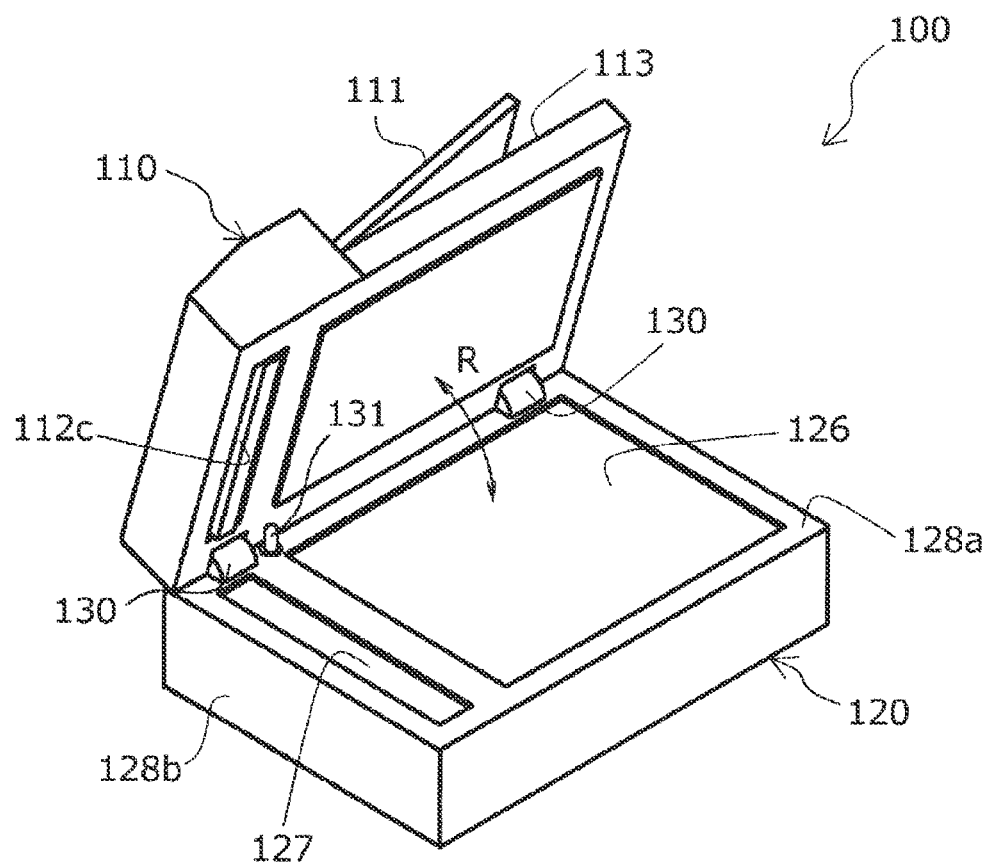
FIG. 2 is a perspective view of an image reading unit of the printer in FIG. 1.
Figure 3:
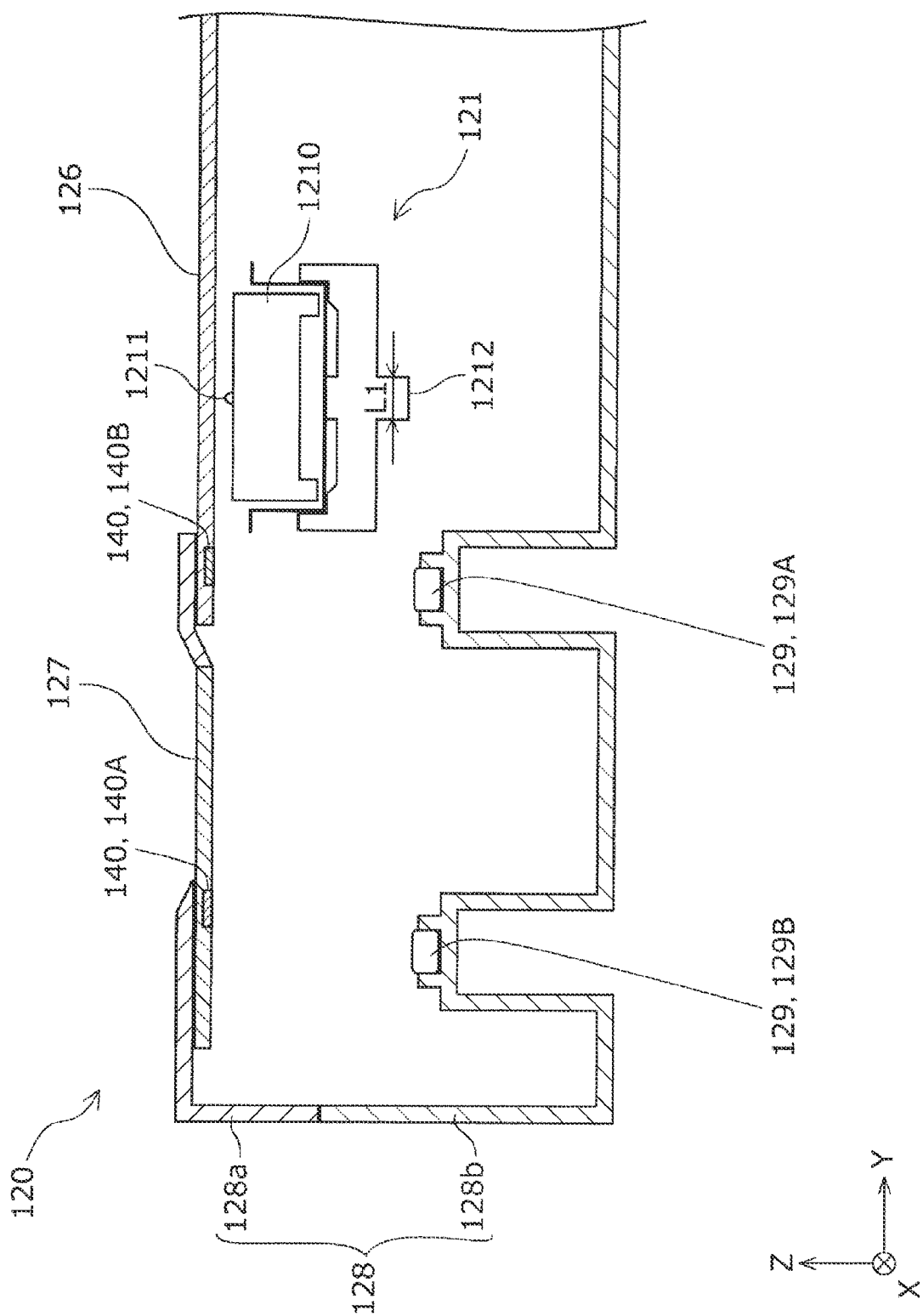
FIG. 3 is a front cross-sectional view illustrating the image reading unit in FIG. 2 in a state in which a carriage is located at a first image reading position.

Hereinafter, the present disclosure will be schematically described.

An image reading device according to a first aspect includes: a reading unit reading an image on a document; a carriage provided with the reading unit and moving with the reading unit; a detector included in the carriage and having a predetermined width in a movement direction of the carriage; a detection sensor being in a detection state when the detector is located at a position where the detector faces the detection sensor and being in a non-detection state when the detector is located at a position where the detector does not face the detection sensor; and a control portion configured to perform a positional shift determination operation of determining a positional shift of the carriage in the movement direction, in which, as the positional shift determination operation, the control portion starts to move the carriage when the detection sensor is in the detection state and determines, based on a moving amount of the carriage from the detection state to the non-detection state of the detection sensor, the positional shift of the carriage.

In the aspect, the positional shift of the carriage is determined based on the moving amount of the carriage from the detection state to the non-detection state by using the detector having the predetermined width in the movement direction of the carriage and the detection sensor being in the detection state when the detector is located at the position facing the detection sensor and being in the non-detection state when the detector is located at the position not facing the detection sensor. That is, the positional shift of the carriage is determined based on a small moving amount of the carriage corresponding to the predetermined width of the detector. Accordingly, the positional shift of the carriage provided with the reading unit can be determined in a short time.

In the image reading device according to a second aspect, in the first aspect, the carriage is located at a home position before the positional shift determination operation is started, the detector is located at a position where the detector faces the detection sensor when the carriage is located at the home position, and the control portion performs the positional shift determination operation when the carriage moves from the home position toward an image reading position where the image on the document is read.

In the aspect, the positional shift determination operation is performed when the carriage moves from the home position toward the image reading position where the image on the document is read. That is, the positional shift determination operation is performed before reading the image on the document. Therefore, a time for performing the positional shift determination operation can be shortened.

The image reading device according to a third aspect, in the second aspect, further includes a mounting portion on which the document is mounted, and a transport portion transporting the document, in which the control portion is configured to perform a first image reading operation of reading an image on a document mounted on the mounting portion and a second image reading operation of reading an image on a document transported by the transport portion, the carriage is movable to a first standby position where the carriage is located before the first image reading operation is performed, a first image reading position where the image on the document mounted on the mounting portion is readable, a second standby position where the carriage is located before the second image reading operation is performed, and a second image reading position where the image on the document transported by the transport portion is readable, and in a case in which the first standby position is the home position, the control portion performs the positional shift determination operation when the carriage moves from the home position toward the second standby position.

In the aspect, the positional shift determination operation is performed when the carriage moves from the first standby position toward the second standby position. Therefore, when the second image reading operation of reading the image on the document transported by the transport portion is performed, the positional shift determination operation is performed before performing the second image reading operation. Accordingly, a time for performing the positional shift determination operation can be shortened when the second image reading operation is performed.

In the image reading device according to a fourth aspect, in the third aspect, a portion to be read that is readable by the reading unit is provided between the home position and the second standby position, and when the control portion determines that the carriage is shifted, the position of the carriage is corrected by the control portion causing the reading unit to read the portion to be read in the process of moving the carriage from the home position toward the second standby position.

In the aspect, when it is determined that the carriage is shifted, the position of the carriage is corrected by reading the portion to be read by the reading unit in the process of moving the carriage from the home position toward the second standby position. Therefore, when it is determined that the carriage is shifted, a time for moving the carriage to the second standby position and then to a position of a specific pattern can be omitted.

The image reading device according to a fifth aspect, in the fourth aspect, further includes a first housing including the mounting portion and a transparent member that is provided at a position where the transparent member faces the reading unit when the carriage is located at the second image reading position, and a second housing movably supporting the carriage and provided at a position where the second housing faces the first housing with the carriage in between, in which the portion to be read is provided in the first housing.

In the aspect, the portion to be read is provided in the first housing. That is, the portion to be read is provided in a housing part on the same side as a side of the carriage in which the document is present. A slight shift may occur due to manufacturing tolerance when the first housing and the second housing movably supporting the carriage are combined. However, even if the shift occurs when the first housing and the second housing are combined due to the portion to be read provided in the first housing, the position of the carriage can be corrected using the portion to be read provided in the housing part on the same side as the side in which the document is present. That is, the position of the carriage can be accurately corrected without affecting the shift caused when the first housing and the second housing are combined.

In the image reading device according to a sixth aspect, in any one of the first to fifth aspects, the control portion determines that the carriage is shifted and corrects the position of the carriage, when the detection sensor is in the non-detection state at the time of the control portion starting the positional shift determination operation.

In the aspect, the control portion determines that the carriage is shifted and corrects the position of the carriage, when the detection sensor is in the non-detection state at the time of starting the positional shift determination operation. Accordingly, the position of the carriage can be quickly corrected when the positional shift of the carriage occurs at an initial stage.

A recording device according to a seventh aspect includes the image reading device according to any one of the first to sixth aspects, and a recording portion performing, based on the image on the document read by the image reading device, recording on a medium.

In the aspect, the image reading device further includes the recording portion performing recording on the medium. Therefore, accurate image reading can be performed quickly to record the image on the medium.

Hereinafter, the present disclosure will be described in detail. First, an outline of an ink jet printer 1, which is an image reading device and recording device of the present disclosure, will be described with reference to FIGS. 1 and 2. Hereinafter, the ink jet printer 1 is simply referred to as a printer 1. An X-Y-Z coordinate system illustrated in each of the drawings is an orthogonal coordinate system, in which an X-axis direction represents a direction intersecting a transport direction of a document and a medium P, that is, a width direction of the document and the medium P, or a device depth direction. In the X-axis direction, a +X direction represents a direction from the front of the device toward the back of the device, and a −X direction represents a direction from the back of the device toward the front of the device.

A Y-axis direction represents a left-right direction when viewed from an operator of the printer 1, in which a +Y direction represent a right side and a −Y direction represents a left side when viewed from the operator of the printer 1. A Z-axis direction represents a vertical direction, that is, a device height direction, in which a +Z direction represents an upward direction, and a −Z direction represents a downward direction. Hereinafter, a direction in which the document or medium P is sent may be referred to as "downstream", and a direction opposite to the direction in which the document or medium P is sent may be referred to as "upstream".

As illustrated in FIG. 1, the printer 1 includes an image reading unit 100 including a reading unit 1210 that reads an image on a document, and a recording unit 200 including a recording portion 203 that performs recording based on the image read by the image reading unit 100, image data input from an external device (not illustrated), or the like. The printer 1 can be referred to as a composite machine including the image reading unit 100 as an image reading device and the recording unit 200 as a recording device.

As illustrated in FIGS. 1 and 2, the image reading unit 100 includes an automatic document transport unit 110 that includes a mounting tray 111 on which a document is mounted, a transport path 112 of the document mounted on the mounting tray 111, and a discharge tray 113 to which the document, which has been transported through the transport path 112 and of which the image has been read, is discharged. As illustrated in FIG. 1, the transport path 112 has a plurality of transport rollers transporting the document and an opening 112c which is also a reading position of the document, and the transport path 112 can transport the document from a pair of rollers 112a constituting an insertion portion to a pair of rollers 112b constituting a discharge portion.

As illustrated in FIG. 1, the image reading unit 100 has a main body unit 120 in which the reading unit 1210, a moving mechanism of the reading unit 1210, and the like are provided in a housing 128. The reading unit 1210 is installed in the carriage 121, and the carriage 121 is attached to a belt 122 bridged to a pulley 124 and a pulley 125. The pulley 124 can rotate by a driving force of a stepping motor 123. As the stepping motor 123 rotates, the pulley 124, the belt 122, and the pulley 125 rotate, and the carriage 121 moves along the Y-axis direction with the rotation of the belt 122. In this case, a DC motor may be used instead of the stepping motor 123. In that case, a position of the carriage 121 may be grasped by using an encoder sensor together.

Here, the image reading unit 100 of the present embodiment can read an image on the document that is transported by the automatic document transport unit 110. A glass plate 127, which is a transparent member, is provided at a position facing the opening 112c of the main body unit 120. As illustrated in FIG. 1, the reading unit 1210 is located at the position facing the opening 112c with the glass plate 127 interposed between the opening 112c and the reading unit 1210, such that the image reading unit 100 can read the image on the document transported by the automatic document transport unit 110. The reading unit 1210 in the present embodiment extends in the X-axis direction, and can read the entire document in a width direction of the document.

The image reading unit 100 of the present embodiment includes a glass plate 126, which is a transparent member on which the document can be mounted, on the main body unit 120. The document is mounted on the glass plate 126 and read by the reading unit 1210 while moving the carriage 121 along the Y-axis direction, such that the image reading unit 100 can read the image on the document mounted on the glass plate 126.

As illustrated in FIG. 2, the image reading unit 100 includes a coupling portion 130 for coupling the automatic document transport unit 110 and the main body unit 120 at a +X direction-side end between the automatic document transport unit 110 and the main body unit 120, making it possible for the automatic document transport unit 110 to rotate in a rotation direction R with respect to the main body unit 120 with the coupling portion 130 as a rotation shaft. As illustrated in FIG. 2, a user can mount the document on the glass plate 126 while the automatic document transport unit 110 is open to the main body unit 120. In addition, the image reading unit 100 includes an opening/closing sensor 131 that detects whether the automatic document transport unit 110 is open or closed to the main body unit 120.

As illustrated in FIG. 1, the recording unit 200 includes a mounting tray 201 on which a plurality of media P can be mounted, a transport path 202 of the medium P mounted on the mounting tray 201, a recording portion 203 performing recording on the medium P transported through the transport path 202, and a discharge tray 204 to which the medium P which has been transported through the transport path 202 and on which recording has been performed is discharged. As illustrated in FIG. 1, the transport path 202 is provided with a plurality of transport rollers transporting the medium P, and the transport path 202 can transport the document from a roller 202a constituting an insertion portion to a pair of rollers 202b constituting a discharge portion. The recording portion 203 of the present embodiment is an ink jet recording head that ejects an ink to the medium P and performs recording, but a recording portion other than the ink jet recording head may be used.

As illustrated in FIG. 1, the recording unit 200 is provided with a control portion 300 that controls the overall driving of the printer 1 of the present embodiment. In the printer 1 of the present embodiment, the control portion 300 may be provided in the recording unit 200, but may be provided in the image reading unit 100. In addition, a control portion that controls the image reading unit 100 may be provided in the image reading unit 100, and a control portion that controls driving of the recording unit 200 may be provided in the recording unit 200.

Next, an arrangement of the carriage 121 in accordance with reading the image on the document in the printer 1 of the present embodiment will be described in detail with reference to FIGS. 3 to 8. The printer 1 of the present embodiment can perform a first image reading operation of reading the image on the document mounted on the glass plate 126 as a mounting portion, and a second image reading operation of reading the image on the document transported by the automatic document transport unit 110. Here, in the printer 1 of the present embodiment, the carriage 121 is located at a position illustrated in FIG. 3, when power is turned off and when the image on the document mounted on the glass plate 126 is read. In addition, the carriage 121 is located at a position illustrated in FIG. 4, when power is turned on and when the automatic document transport unit 110 is open to the main body unit 120 as illustrated in FIG. 2. In addition, the carriage 121 is located at a position illustrated in FIG. 5, when power is turned on and when the automatic document transport unit 110 is closed to the main body unit 120. In addition, the carriage 121 is located at a position illustrated in FIG. 6, when the second image reading operation of transporting the document by the automatic document transport unit 110 and reading the image is performed.

Figure 5:
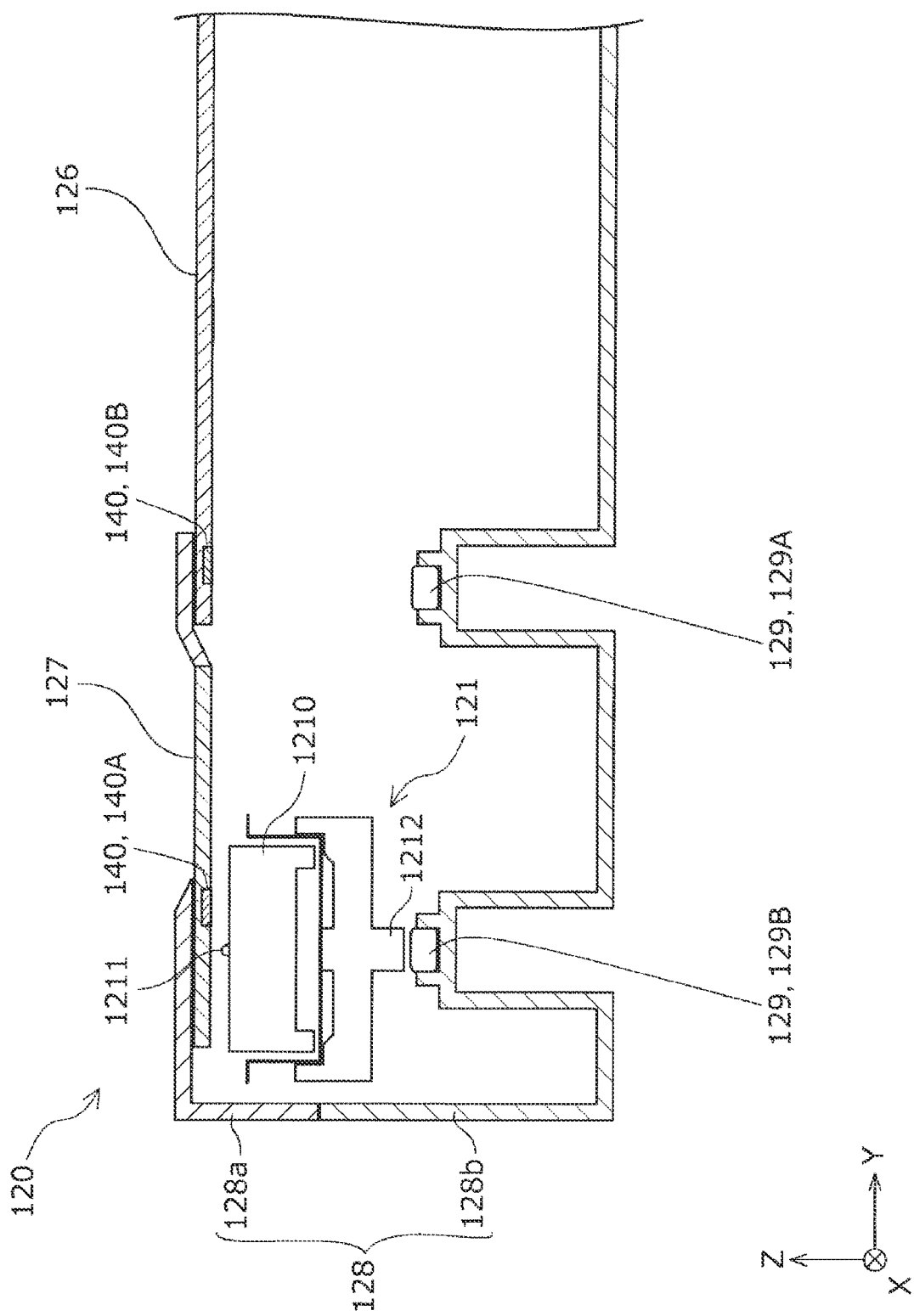
FIG. 5 is a front cross-sectional view illustrating the image reading unit in FIG. 2 in a state in which the carriage is located at a second standby position.
Figure 6:
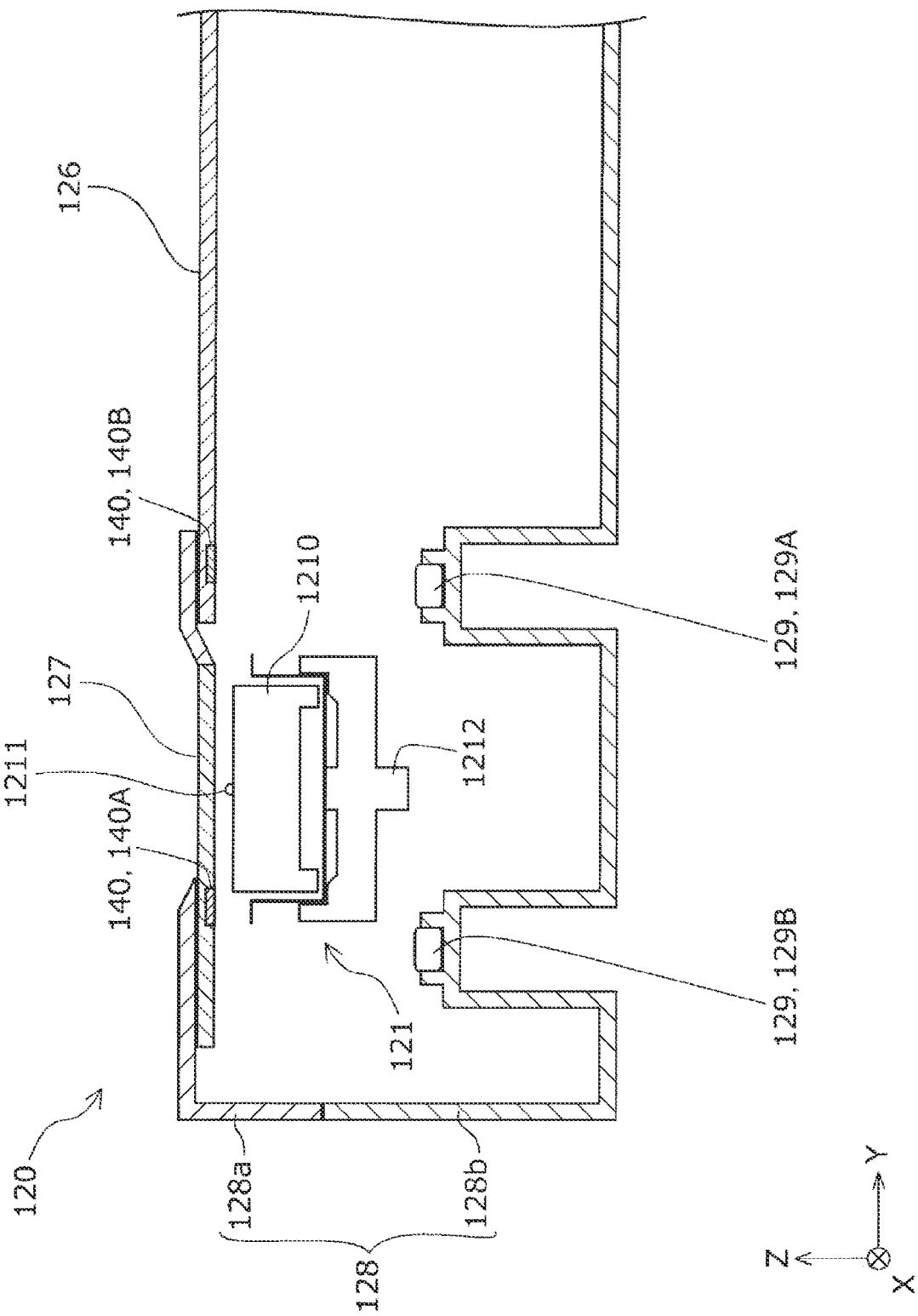
FIG. 6 is a front cross-sectional view illustrating the image reading unit in FIG. 2 in a state in which the carriage is located at a second image reading position.

Here, the carriage 121 can be located from a +Y direction-side end to a −Y direction-side end in the housing 128, corresponding to a portion between the pulley 124 and the pulley 125 in FIG. 1. More specifically, the carriage 121 can be located at a first image reading position which is a position where the image on the document mounted on the glass plate 126 is read in accordance with the first image reading operation illustrated in FIG. 3, a first standby position which is a home position when the first image reading operation illustrated in FIG. 4 is performed, a second standby position which is a home position when the second image reading operation illustrated in FIG. 5 is performed, and a second image reading position which is a position where the image on the document transported by the automatic document transport unit 110 illustrated in FIG. 6 is read in accordance with the second image reading operation.

Here, as illustrated in FIGS. 3 to 6, the reading unit 1210 including a reading module 1211 is installed on the carriage 121, and a detector 1212 having a predetermined width L1 in a movement direction of the carriage is provided on a −Z direction-side end of the carriage 121. In addition, the housing 128 includes a first housing 128a which is a housing on a +Z direction side and a second housing 128b which is a housing on a −Z direction side. The second housing 128b is provided with two detection sensors 129A and 129B as the detection sensor 129. The detection sensor 129 is in a detection state when the detector 1212 is located at a position facing the detection sensor 129 and is in a non-detection state when the detector 1212 is located at a position not facing the detection sensor 129.

Figure 4:
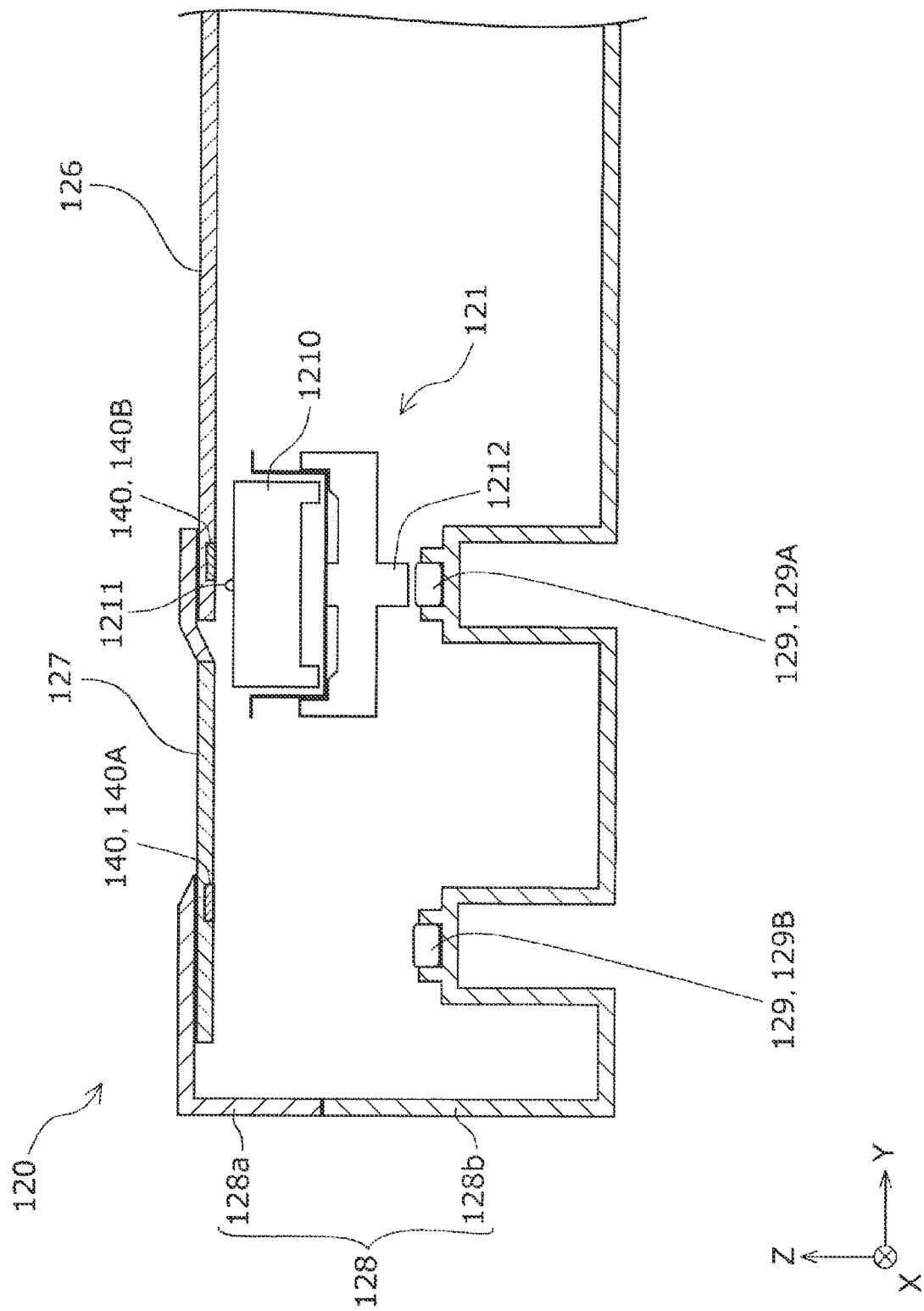
FIG. 4 is a front cross-sectional view illustrating the image reading unit in FIG. 2 in a state in which the carriage is located at a first standby position.

The detection sensor 129A is arranged to face the detector 1212 when the carriage 121 is located at the first standby position as illustrated in FIG. 4. The detection sensor 129 detects the detector 1212 at a central portion in the Y-axis direction of the detection sensor 129, together with the detection sensor 129A and the detection sensor 129B. Therefore, when the carriage 121 moves to the +Y direction side or the −Y direction side by a half distance of the predetermined width L1 in a state in which the carriage 121 is located at the first standby position as illustrated in FIG. 4, the detection sensor 129A changes from the detection state to the non-detection state.

The carriage 121 is attached to the belt 122 as described above in the printer 1 of the present embodiment. For example, when a booklet-shaped document is opened and mounted on the glass plate 126 to be pressed, and starts to perform the image reading operation of the document as its state, a force pressing the glass plate 126 is transferred to the inside of the main body unit 120. Accordingly, component members constituting the glass plate 126 and the inside of the housing 128 are deformed to impede the movement of the carriage 121. In such a case, an actual position of the carriage 121 and a position predicted from a command value to the carriage 121 may be shifted from each other. To reduce the positional shift, the printer 1 of the present disclosure can perform a positional shift determination operation of determining the positional shift of the carriage 121 in the movement direction of the carriage 121 along the Y-axis direction by the control of the control portion 300. Specifically, as the positional shift determination operation, the control portion 300 can start to move the carriage 121 when the detection sensor 129 is in the detection state, and determine the positional shift of the carriage 121 based on a moving amount of the carriage 121 from the detection state to the non-detection state of the detection sensor 129.

In other words, the printer 1 of the present embodiment can determine the positional shift of the carriage 121, based on a small moving amount of the carriage 121 corresponding to the predetermined width L1 of the detector 1212. Accordingly, the positional shift of the carriage 121 provided with the reading unit 1210 can be determined in a short time. Here, "the positional shift of the carriage 121 is determined based on the moving amount of the carriage 121" means that determination is made whether or not the detection sensor 129 changes from the detection state to the non-detection state at the time of estimating the carriage 121 moved by a predetermined amount based on the number of steps or the like of the stepping motor 123. For the determination at the time of estimating the carriage 121 moved by a predetermined amount, a time required to move the carriage 121 may be used, in addition to the number of steps of the stepping motor 123. Further, the printer 1 of the present embodiment includes the recording portion 203 that performs recording on the medium P. Therefore, accurate image reading can be performed quickly to record the image on the medium.

Here, in the present embodiment, as a method of determining the positional shift of the carriage 121 based on the moving amount of the carriage 121, a method of determining whether or not the number of steps of the stepping motor 123 as a driving portion for moving the carriage 121 is the theoretical number of steps from the detection state to the non-detection state is used. However, the method of determining the positional shift of the carriage based on the moving amount of the carriage is not particularly limited as long as a method of measuring a time from the detection state to the non-detection state with a timer and the like and comparing the measured time with a predetermined value can be adopted.

Figure 8:
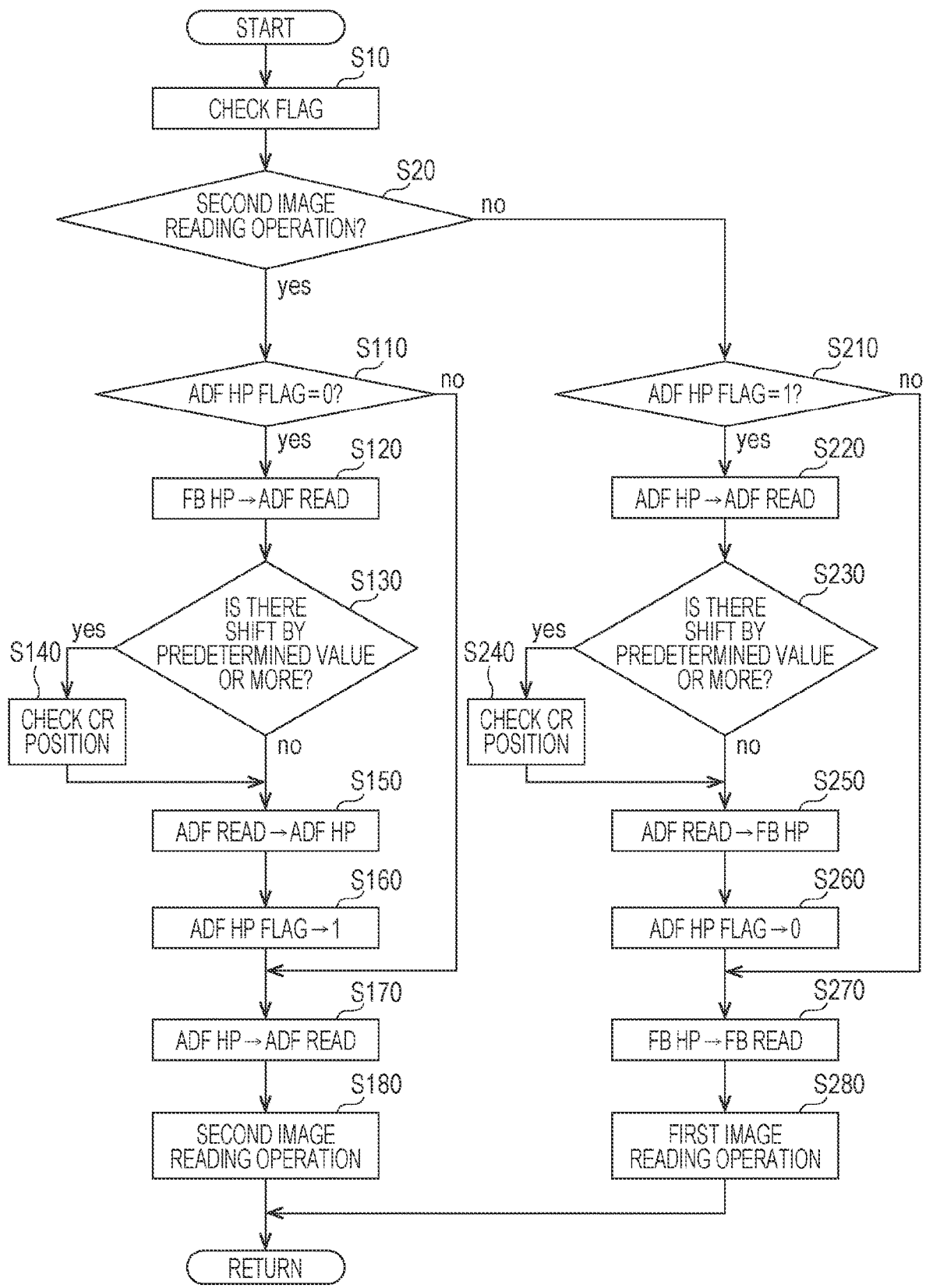
FIG. 8 is a flowchart illustrating an example of an image reading flow of a document performed using the printer in FIG. 1.

Here, an example of an image reading flow of a document performed using the printer 1 will be described with reference to FIG. 8. The following image reading flow is performed by the control of the control portion 300.

When the image reading flow of the document in the present embodiment is started, first, a flag stored in a storage portion of EEPROM and the like included in the control portion 300 is checked in Step S10. Here, the image reading flow may be started by detecting the document mounted on the mounting tray 111 by a sensor (not illustrated) or detecting a state in which the automatic document transport unit 110 is open to the main body unit 120 by the opening/closing sensor 131 in order to mount the document on the glass plate 126, in addition to a request to start the first image reading operation of reading the image on the document mounted on the glass plate 126 as a flatbed (FB) and a request to start the second image reading operation of reading the image on the document transported by automatic document transport unit (automatic direction finder (ADF)) 110. In addition, the checking of the flag in Step S10 is checking of the flag regarding the position of the carriage 121, and the like.

Next, it is determined in Step S20 whether or not the request to start the image reading flow is the request to start the second image reading operation. When the request to start the image reading flow is the request to start the second image reading operation, the process proceeds to Step S110, and when the request to start the image reading flow is not the request to start the second image reading operation, the process proceeds to Step S210.

In Step S110, the control portion 300 determines whether or not a flag (ADF HP flag) indicating that the carriage 121 is located at a standby position (ADF HP) in the second image reading operation illustrated in FIG. 5 is raised. When the ADF HP flag is not 0, that is, when it is determined that the carriage 121 is located at the ADF HP, the process proceeds to Step S170. On the other hand, when the ADF HP flag is 0, that is, when it is determined that the carriage 121 is not located at the ADF HP, the control portion 300 determines that the carriage 121 is located at a standby position (FB HP) in the first image reading operation illustrated in FIG. 4, and the process proceeds to Step S120. Error checking and the like may be performed on the operation of the automatic document transport unit 110 while the process proceeds from Step S20 to Step S110.

In Step S120, the carriage 121 moves from the FB HP to the second image reading position (ADF READ) illustrated in FIG. 6. Here, the detection sensor 129A detects switching from the detection state when located facing the detector 1212 to the non-detection state when located not facing the detector 1212, while the carriage 121 moves from the FB HP to the ADF READ. Then, the control portion 300 determines whether or not switching from the detection state to the non-detection state has been made with a predetermined number of steps with which switching from the detection state to the non-detection state should be made. Specifically, the predetermined number of steps is compared with the actual number of steps in Step S130 to determine whether or not the carriage 121 is shifted from the belt 122 by a predetermined value or more. When the control portion 300 determines that the carriage 121 is shifted from the belt 122 by a predetermined value or more in Step S130, the process proceeds to Step S150 through Step S140, and when the control portion 300 determines that the carriage 121 is not shifted from the belt 122 by a predetermined value or more in Step S130, the process proceeds to Step S150 without through Step S140.

In Step S140, the position of the carriage 121 is checked and adjusted by driving the stepping motor 123. Step S140 is performed by reading a specific pattern 140 which is a portion to be read that is readable by the reading unit 1210. As illustrated in FIGS. 3 to 6, the printer 1 has a specific pattern 140A and a specific pattern 140B as the specific pattern 140, but the specific pattern 140A is read in the present embodiment. The specific pattern 140A is the specific pattern 140 located between the ADF HP illustrated in FIG. 5 and the ADF READ illustrated in FIG. 6. The position between the ADF HP and the ADF READ here is located between a reading module 1211 in the ADF HP and a reading module 1211 in the ADF READ. In addition, the position between the ADF HP and the ADF READ may be located between the detector 1212 in the ADF HP and the detector 1212 in the ADF READ.

Figure 7:
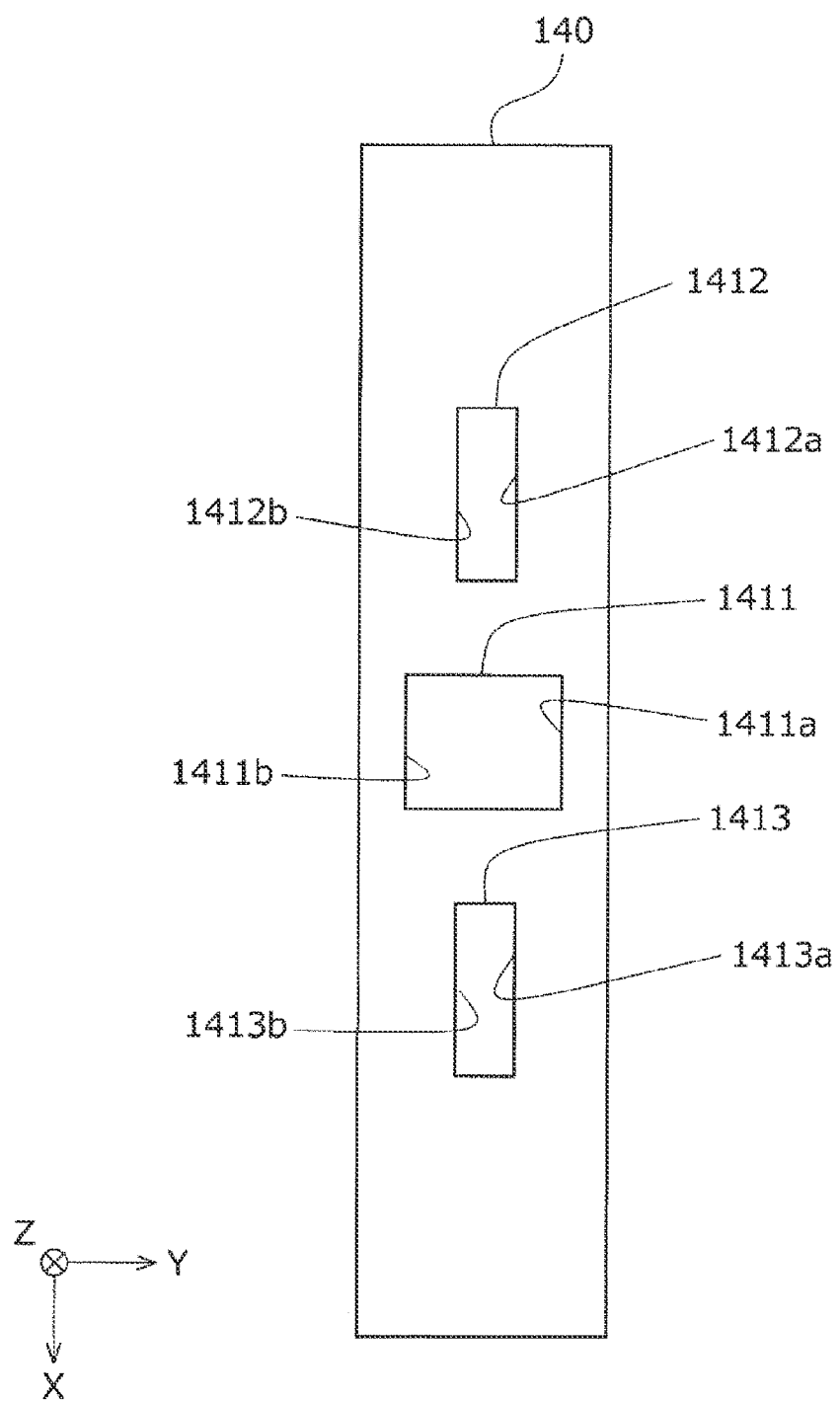
FIG. 7 is a bottom view illustrating a specific pattern of the image reading unit in FIG. 2.

Here, both the specific pattern 140A and the specific pattern 140B have the same configuration and a shape illustrated in FIG. 7. When adjusting the position of the carriage 121, the position of the carriage 121 is determined by reading an edge 1411*a* and an edge 1411*b* of an opening 1411, an edge 1412*a* and an edge 1412*b* of an opening 1412, and an edge 1413*a* and an edge 1413*b* of an opening 1413, the edges 1411*a*, 1411*b*, 1412*a*, 1412*b*, 1413*a*, and 1413*b* each being formed on a side in the Y-axis direction, the openings 1411, 1412, and 1413 being formed in the specific pattern 140.

In Step S150, the carriage 121 moves from the ADF READ to the ADF HP once. When the carriage 121 moves to the ADF HP, a flag indicating that the carriage 121 is located at the ADF HP is raised in Step S160. In the present embodiment, Step S130 and Step S140 are performed immediately after Step S120, but the printer 1 can perform Step S130 and Step S140 immediately after Step S160.

Next, In Step S170, the carriage 121 moves from the ADF HP to the ADF READ. Then, the second image reading operation is started in Step S180. Between Step S160 and Step S170, a step of determining whether or not an execution command for the second image reading operation is issued, a step of determining whether or not shading is performed, or the like may be performed.

In Step S210, the control portion 300 determines whether or not a flag (ADF HP flag) indicating that the carriage 121 is located at a standby position (ADF HP) in the second image reading operation illustrated in FIG. 5 is raised. When the ADF HP flag is 1, that is, when the carriage 121 is not located at the ADF HP, the control portion 300 determines that the carriage 121 is located at a standby position (FB HP) in the first image reading operation illustrated in FIG. 4, and the process proceeds to Step S270. On the other hand, when the ADF HP flag is not 1, that is, when the carriage 121 is located at the ADF HP, the process proceeds to Step S220.

In Step S220, the carriage 121 moves from the ADF HP to the ADF READ. Here, the detection sensor 129B detects switching from the detection state when located facing the detector 1212 to the non-detection state when located not facing the detector 1212, while the carriage 121 moves from the ADF HP to the ADF READ. Then, the control portion 300 determines whether or not switching from the detection state to the non-detection state has been made with a predetermined number of steps with which switching from the detection state to the non-detection state should be made, and compares the predetermined number of steps with the actual number of steps in Step S230 to determine whether or not the carriage 121 is shifted from the belt 122 by a predetermined value or more. When the control portion 300 determines that the carriage 121 is shifted from the belt 122 by a predetermined value or more in Step S230, the process proceeds to Step S250 through Step S240, and when the control portion 300 determines that the carriage 121 is not shifted from the belt 122 by a predetermined value or more in Step S230, the process proceeds to Step S250 without through Step S240.

In Step S240, the position of the carriage 121 is checked and adjusted by driving the stepping motor 123. Step S240 is performed by reading a specific pattern 140A which is a portion to be read that is readable by the reading unit 1210.

In Step S250, the carriage 121 moves from the ADF READ to the FB HP. When the carriage 121 moves to the FB HP, a flag indicating that the carriage 121 is located at the ADF HP is released in Step S260. In the present embodiment, Step S230 and Step S240 are performed immediately after Step S220, but the printer 1 can perform Step S230 and Step S240 immediately after Step S260. In this case, Step S230 can be performed by reading the specific pattern 140B. The specific pattern 140B is the specific pattern 140 located between the FB HP illustrated in FIG. 4 and FB READ illustrated in FIG. 3. The position between the FB HP and the FB READ here is located between a reading module 1211 in the FB HP and a reading module 1211 in the FB READ. In addition, the position between the FB HP and the FB READ may be located between the detector 1212 in the FB HP and the detector 1212 in the FB READ.

Next, in Step S270, the carriage 121 moves from the FB HP to the FB READ. Then, the first image reading operation is started in Step S280. Between Step S260 and Step S270, a step of determining whether or not an execution command for the first image reading operation is issued, or the like may be performed.

The carriage 121 of the present embodiment is located at the home position (FB HP) before starting the positional shift determination operation as shown in Step S120. In addition, the detection sensor 129A is arranged to face the detector 1212 when the carriage 121 is located at the FB HP as illustrated in FIG. 4. Then, the control portion 300 performs the positional shift determination operation when the carriage 121 moves from the FB HP toward the image reading position (ADF READ) where the image on the document is read, as shown in Step S130.

As such, the printer 1 of the present embodiment performs the positional shift determination operation when the carriage 121 moves from the home position toward the image reading position where the image on the document is read. That is, the printer 1 of the present embodiment performs the positional shift determination operation before reading the image on the document. Therefore, the printer 1 of the present embodiment does not have a configuration in which the carriage 121 moves to a predetermined position and returns from the predetermined position to determine the positional shift. Therefore, a time at which the positional shift determination operation is performed can be shortened. In the image reading flow of the present embodiment, the home position is the first standby position (FB HP) where the carriage is located before performing the first image reading operation, but is not limited to such a configuration.

The home position may be the second standby position (ADF HP) where the carriage is located before performing the second image reading operation, or may be a separate position such as the first image reading position (FB READ) and the second image reading position (ADF READ). Here, when setting the home position other than the FB HP, it is necessary to arrange the detection sensor 129 at a position corresponding to the home position.

From another point of view of the above description, the printer 1 of the present embodiment includes the glass plate 126 as a mounting portion that mounts the document, and the automatic document transport unit 110 as a transport portion that transports the document. Further, the control portion 300 can perform the first image reading operation of reading the image on the document mounted on the glass plate 126, and the second image reading operation of reading the image on the document transported by the automatic document transport unit 110. Further, the carriage 121 can move to the first standby position (FB HP), illustrated in FIG. 4, where the carriage 121 is located before performing the first image reading operation, the first image reading position (FB READ), illustrated in FIG. 3, where the image on the document mounted on the glass plate 126 is readable, the second standby position (ADF HP), illustrated in FIG. 5, where the carriage 121 is located before performing the second image reading operation, and the second image reading position (ADF READ), illustrated in FIG. 6, where the image on the document transported by the automatic document transport unit 110 is readable. Then, the control portion 300 sets the first standby position (FB HP) as the home position, and can perform the positional shift determination operation when the carriage 121 moves from the first standby position (FB HP) toward the second standby position (ADF HP), as shown in Step S120 to Step S150.

As such, the printer 1 of the present embodiment performs the positional shift determination operation when the carriage 121 moves from the first standby position (FB HP) toward the second standby position (ADF HP). Therefore, when the second image reading operation of reading the image on the document transported by the automatic document transport unit 110 is performed, the printer 1 performs the positional shift determination operation before performing the second image reading operation. Accordingly, it is possible to shorten a time for reading the specific pattern 140 from the ADF HP and returning to the ADF HP again, that is, a time for performing the positional shift determination operation, when the second image reading operation is performed.

As described above, the printer 1 of the present embodiment has the specific pattern 140A in the specific pattern 140 provided between the FB HP and the ADF HP as a portion to be read that is readable by the reading unit 1210. Further, when the control portion 300 determines that the carriage 121 is shifted, the position of the carriage 121 is corrected by reading the specific pattern 140A by the reading unit 1210 in the process of moving the carriage 121 from the FB HP toward the ADF HP. Therefore, when the control portion 300 determines that the carriage 121 is shifted, a time for moving the carriage 121 to the ADF HP and then to the position of the specific pattern 140 can be omitted.

In the image reading flow of the present embodiment, in a case in which the positional shift determination operation is performed when the carriage 121 moves from the first standby position (FB HP) toward the second standby position (ADF HP) to determine that the carriage 121 is shifted, the reading operation of the specific pattern 140 is performed in the process of moving the carriage 121 from the first standby position (FB HP) toward the second standby position (ADF HP), as shown in Step S120 to Step S150. However, it is not limited to such a configuration. In a case in which the positional shift determination operation is performed when the carriage 121 moves from the first standby position (FB HP) toward the second standby position (ADF HP) to determine that the carriage 121 is shifted, the carriage 121 may move to the second standby position (ADF HP) and then to the position of the specific pattern 140 to perform the reading operation of the specific pattern 140. Furthermore, a movement distance at the time of returning may be measured using an encoder and the like, without using the specific pattern 140, to determine the positional shift of the carriage 121 from a shift from a desired movement distance.

As illustrated in FIGS. 3 to 6, the printer 1 of the present embodiment includes the first housing 128a located on the +Z direction side and the second housing 128b located on the −Z direction side, as the housing 128. The first housing 128a includes the glass plate 126 as a mounting portion, and a glass plate 127, as a transparent member, located facing the reading unit 1210 when the carriage 121 is located at the second image reading position as illustrated in FIG. 6. In addition, the second housing 128b movably supports the carriage 121 along the Y-axis direction, and is located facing the first housing 128a with the carriage 121 interposed between the first housing 128a and the second housing 128b. Here, the specific pattern 140 is provided in the first housing 128a.

As described above, the printer 1 of the present embodiment is provided with the specific pattern 140 in a housing part on the same side as a side of the carriage 121 in which the document is present. A slight shift may occur due to manufacturing tolerance when the first housing 128a and the second housing 128b movably supporting the carriage 121 are combined. However, even if the shift occurs when the first housing 128a and the second housing 128b are combined due to the specific pattern 140 provided in the first housing 128a, the position of the carriage 121 can be corrected using the specific pattern 140 provided in the housing part on the same side as the side in which the document is present. That is, the printer 1 of the present embodiment can accurately correct the position of the carriage 121 with respect to the housing part on the same side as the side in which the document is present, without affecting the shift caused when the first housing 128a and the second housing 128b are combined.

As a result, the document can be accurately read.

Here, when the detection sensor 129A is in the non-detection state at the time of starting the positional shift determination operation, that is, when the carriage is not located at the position (illustrated in FIG. 4) at the time of starting the positional shift determination operation, the control portion 300 can determine that the carriage 121 is shifted and correct the position of the carriage 121. Accordingly, the printer 1 of the present embodiment can quickly correct the position of the carriage 121 when the positional shift of the carriage 121 occurs at an initial stage.

The present disclosure is not limited to the aforementioned embodiments. Various modifications can be made within the scope of the disclosure defined by the appended claims, and such modifications should be included in the scope of the present disclosure.

What is claimed is:
1. An image reading device comprising:
a reading unit reading an image on a document;

a carriage provided with the reading unit and moving with the reading unit;

a detector included in the carriage and having a predetermined width in a movement direction of the carriage;

a detection sensor being in a detection state when the detector is located at a position where the detector faces the detection sensor and being in a non-detection state when the detector is located at a position where the detector does not face the detection sensor; and a control portion configured to perform a positional shift determination operation of determining a positional shift of the carriage in the movement direction, wherein as the positional shift determination operation, the control portion starts to move the carriage when the detection sensor is in the detection state and determines the positional shift of the carriage, based on a moving amount of the carriage from the detection state to the non-detection state of the detection sensor.

2. The image reading device according to claim 1, wherein the carriage is located at a home position before the positional shift determination operation is started, the detector is located at a position where the detector faces the detection sensor when the carriage is located at the home position, and the control portion performs the positional shift determination operation when the carriage moves from the home position toward an image reading position where the image on the document is read.

3. The image reading device according to claim 2, further comprising:

a mounting portion on which the document is mounted; and a transport portion transporting the document, wherein the control portion is configured to perform a first image reading operation of reading an image on a document mounted on the mounting portion and a second image reading operation of reading an image on a document transported by the transport portion, the carriage is configured to move to a first standby position where the carriage is located before the first image reading operation is performed, a first image reading position where the image on the document mounted on the mounting portion is configured to be read, a second standby position where the carriage is located before the second image reading operation is performed, and a second image reading position where the image on the document transported by the transport portion is configured to be read, and in a case in which the first standby position is the home position, the control portion performs the positional shift determination operation when the carriage moves from the home position toward the second standby position.

4. The image reading device according to claim 3, wherein a portion to be read that is configured to be read by the reading unit is provided between the home position and the second standby position, and when the control portion determines that the carriage is shifted, a position of the carriage is corrected by the control portion causing the reading unit to read the portion to be read in a process of moving the carriage from the home position toward the second standby position.

5. The image reading device according to claim 4, further comprising:

a first housing including the mounting portion and a transparent member provided at a position facing the reading unit when the carriage is located at the second image reading position; and a second housing supporting the carriage configured to move and provided at a position facing the first housing with the carriage in between, wherein the portion to be read is provided in the first housing.

6. The image reading device according to claim 1, wherein the control portion determines that the carriage is shifted and corrects a position of the carriage, when the detection sensor is in the non-detection state at a time of the control portion starting the positional shift determination operation.

7. A recording device comprising:

the image reading device according to claim 1; and a recording portion performing, based on the image on the document read by the image reading device, recording on a medium.

* * * * *